United States Patent [19]

Duga

[11] Patent Number: 4,723,981
[45] Date of Patent: Feb. 9, 1988

[54] GOB DISTRIBUTOR

[75] Inventor: Robert J. Duga, Enfield, Conn.

[73] Assignee: Emhart Industries, Inc., Farmington, Conn.

[21] Appl. No.: 18,120

[22] Filed: Feb. 24, 1987

[51] Int. Cl.⁴ .............................................. C03B 7/20
[52] U.S. Cl. ...................................... 65/225; 65/164; 65/304
[58] Field of Search ................. 65/159, 164, 165, 171, 65/225, 304

[56] References Cited

U.S. PATENT DOCUMENTS 3,775,083  11/1973  Nebelung et al. ................ 65/225
4,599,101  7/1986  Douglas et al. ................ 65/225 X Primary Examiner—Arthur Kellogg
Attorney, Agent, or Firm—Spencer T. Smith

[57] ABSTRACT

A gob distributor comprising a head inclining at least one gob scoop relatively displaceable through a predetermined angular range. The gob scoop can be displaced by structure which includes a ball screw, a nut, a housing, and a carriage secured to the nut. The carriage has an upstanding arm which will strike a selectively located and contained compression pad in the event the ball nut is displaced beyond its intended range. The arm may also, prior to striking the pad, displace a plunger which will operate a control switch to disable the system.

2 Claims, 3 Drawing Figures

GOB DISTRIBUTOR

The present invention relates to mechanisms for distributing glass gobs received from a gob feeder to a trough assembly which feeds discrete glassware forming stations.

Gob distributors include a head which usually has a plurality of gob scoops mounted for rotative displacement. Gobs are fed to these glassware forming stations by displacing the gob scoops in accordance with a predetermined program. Such displacement is carried out by a servo-controlled ball screw assembly. The movement of the ball screw nut will be electronically controlled within predetermined limits within the ball screw housing to prevent crashes between the ball screw nut and the housing.

It is an object of the present invention to provide a mechanism for handling such a crash in the event the electronics fails to maintain the ball screw nut within its desired operating range.

Other objects and advantages of the present invention will become apparent from the following portion of this specification and from the accompanying drawings which illustrate, in accordance with the mandate of the patent statutes, a presently preferred embodiment incorporating the principles of the invention.

Referring to the drawings.

Figure 2:
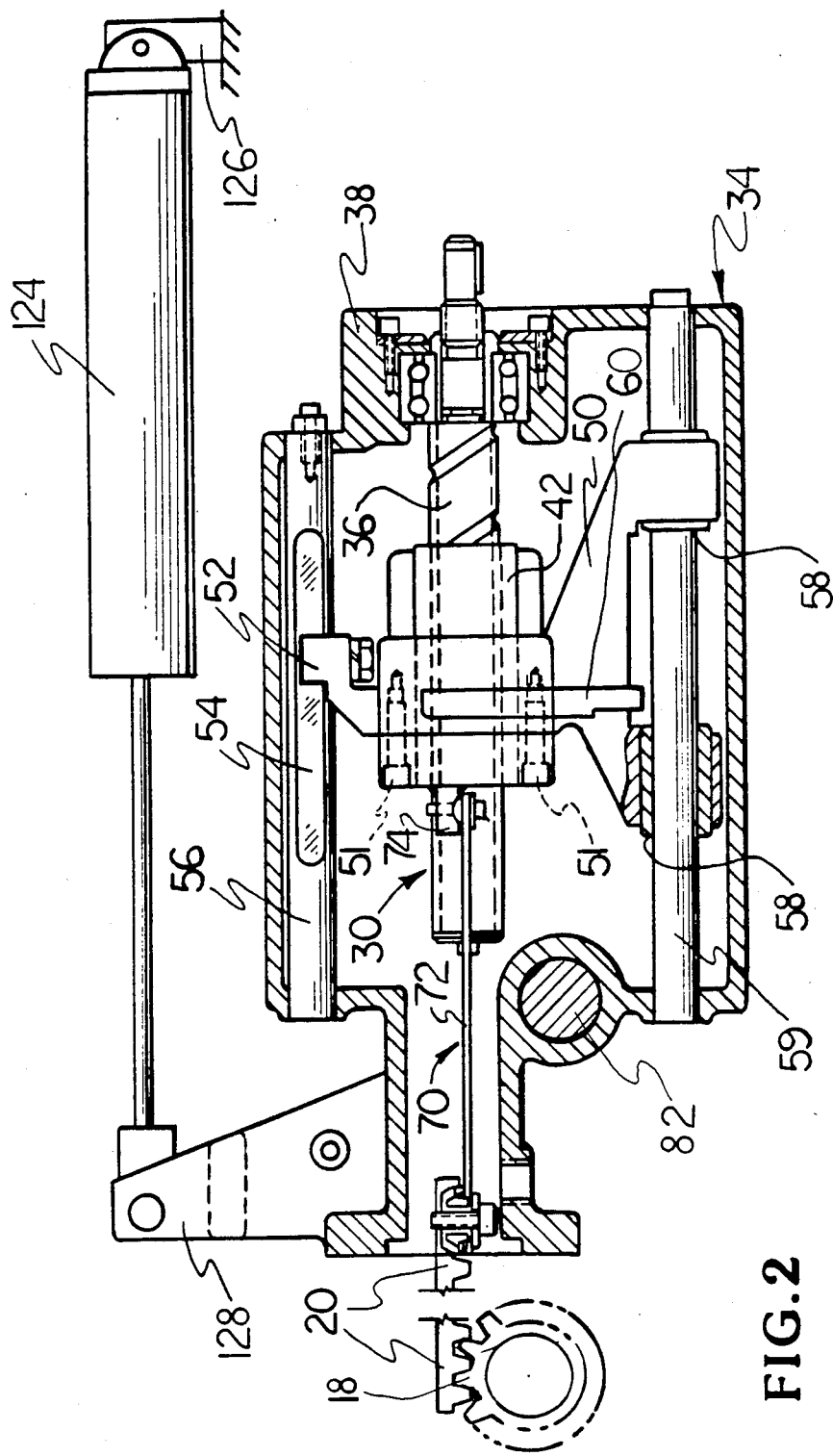
FIG. 2 is a view looking downwardly into the lower casting of the ball screw housing.

The gob distributor includes a head 10 which has a housing 12 supporting a number of gob scoops 14. These scoops 14 receive and redirect gobs to a fixed array of troughs (not shown) which feed discrete glassware forming stations. The housing also supports a corresponding number of gob receiving ends 16 which receive gobs from a gob feed and guide these gobs to the scoops 14. As illustrated in FIG. 2, each gob scoop 14 has a pinion 18 which interconnects with a rack 20 so that the gob scoops can be rotatively displaced in unison through a desired angular range by selective displacement of the rack.

Figure 1:
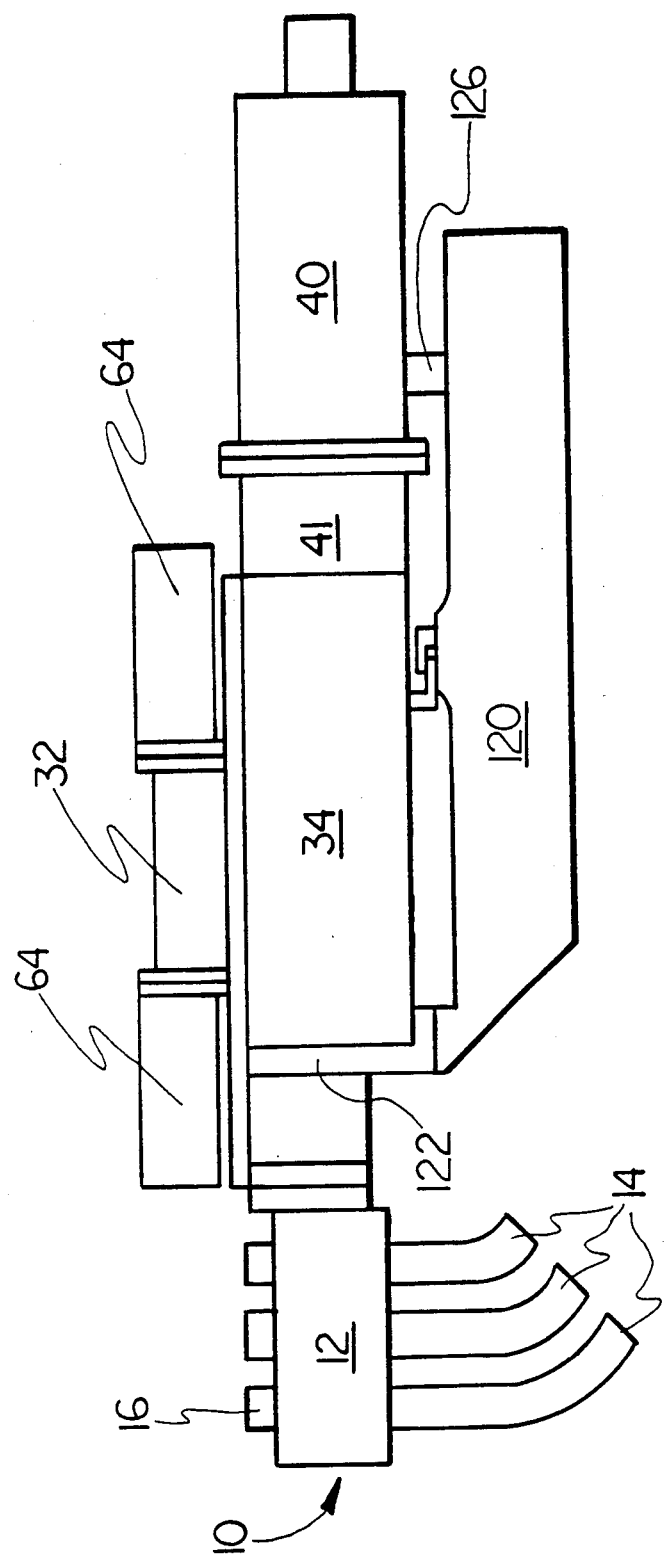
FIG. 1 is a side elevational view of a gob distributor made in accordance with the teachings of the present invention.

The displacement of the rack 20 is controlled by a ball screw assembly 30 (FIG. 2) which is contained within a housing having upper 32 and lower 34 parts (FIG. 1). As shown in FIG. 2, a ball screw 36 is journalled into the right end wall 38 of the lower housing 34. Rotation of the ball screw 36 by a servo motor 40 via a coupling 41, advances or retracts a ball screw nut 42. To maintain this ball screw nut 42 at its desired orientation throughout its displacement, a carriage 50 is secured to the ball screw nut 42 via bolts 51. The carriage 50 extends towards one side of the lower housing 34 and rotatably supports upper 52 and lower (not shown) rollers which ride on flats 54 (only the top flat is shown) defined on a support rod 56 extending between the ends of the lower housing 34. The carriage 50 also extends toward the other side of the lower housing 34 and supports a pair of axially spaced cylindrical bushings 58 which slide along a second rod 59. This rod 59 extends, parallel to the first rod 56, between the ends of the lower housing 34. The ball screw nut 42 is connected via a coupling 70 to the rack 20. The coupling includes a link 72 which is secured at its right end to nut brackets 74 and which is secured at its other end to the rack 20.

Figure 3:
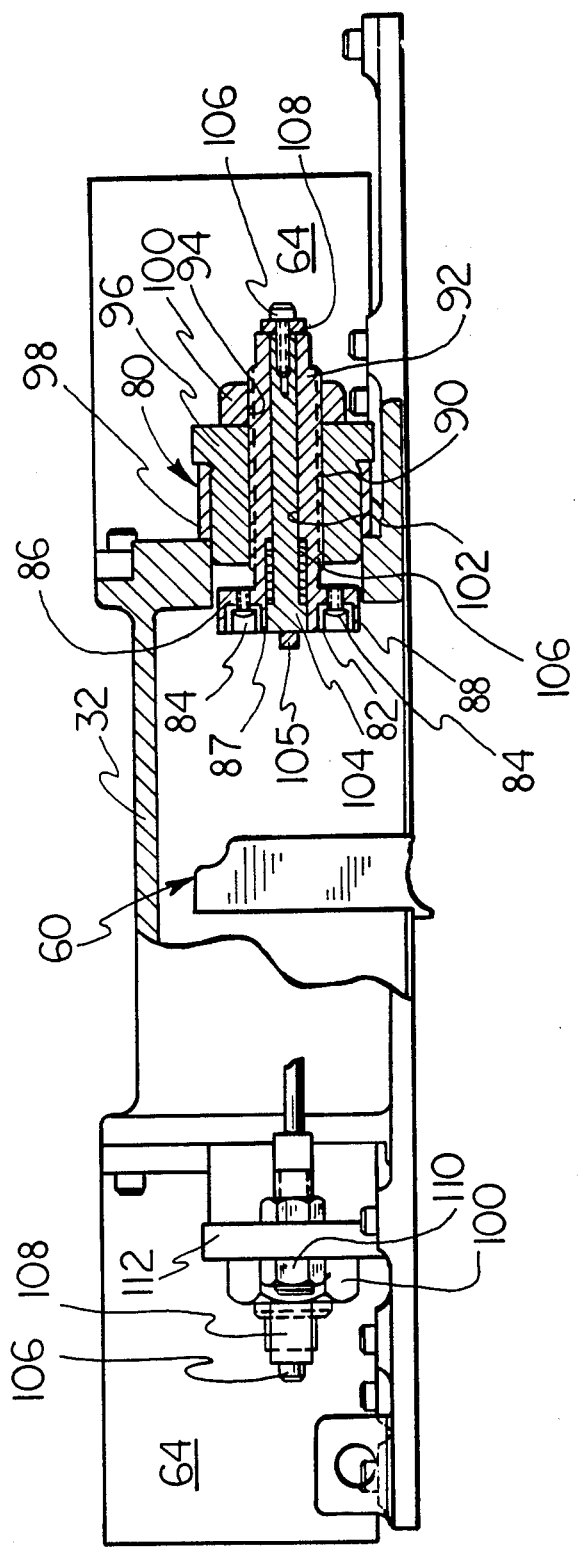
FIG. 3 is an elevational view of the upper ball screw housing, partly in cross-section, taken from the opposite side of the gob distributor.

As can be seen from FIGS. 2 and 3, the carriage 50 also includes an arm 60 which projects upwardly into the upper housing 32 to intersect the axes of a pair of opposed bumper assemblies 80. Each assembly 80 has a bumper in the form of a cylindrical rubber compression pad 82 which is annular in form and which is secured by a pair of screws 84 to a support housing 86 which supports the bottom of the pad 82 as well as the sides thereof by means of inner 87 and outer 88 annular walls, whereby the pad 82 cannot spread under a compressive load. The pad support housing 86 has a threaded axial section 92 which is received by a threaded bore 94 in a sleeve member 96 which is secured to the upper ball screw housing 32 by bolts (not shown). A spacer 98 properly positions the sleeve member 96. A nut 100 secures the axial section 92 to the sleeve at a selected position to properly present the bumper pad 82.

Extending through the central bore 102 of each support housing 86 is a control plunger 104 which is biased by a spring element 106 to the illustrated projecting location where a small pin portion 105 extends inwardly beyond the pad 82. Secured to the other end of the control plunger 104 by a screw 108 is an operating bracket 108 for a switch 110 which is mounted on an outwardly extending wall 112 of the sleeve member 96.

During the programmed displacement of the ball screw nut 42 (and hence, arm 60), the arm 60 should not engage either bumper assembly 80, but if the control system fails and the arm 60 is displaced beyond its intended limits, it will first engage and axially displace the plunger 104 of one of these assemblies thereby opening the switch 110 to signal the controls to stop the ball screw feed system. Further displacement will result in the arm 60 forcefully engaging the rubber pad 82. Because the pad is effectively contained within the support housing and cannot spread, a force can be absorbed which is large enough to prevent the crashing of the ball nut assembly.

The ball screw housing is supported by a support bracket 120 for pivotal movement about a vertical shaft 122 and the entire gob distributor including the head 10, ball screw assembly 30 and the screw drive motor 40 and coupling 41, can be pivoted from an operative position to a remote position where the head will be removed from the gob feeder, by operating the retract cylinder 124 which extends between a support bracket arm 126 and a lower housing arm 128.

I claim:

1. A gob distributor comprising
   a head including at least one gob scoop rotatively displaceable through a predetermined angular range,
   means for displacing said gob scoop including
      a ball screw,
      a ball screw nut,
      a ball screw housing,
      carriage means secured to said ball screw nut, and
   means secured to said ball screw housing for guiding the displacement of said carriage means,
   said carriage means having an upstanding arm, and
   first and second opposed assemblies mounted on said ball screw housing to intersect with said upstanding arm, each of said assemblies including bumper pad means, and support means having a pocket for containing said bumper pad means so that when said arm engaged and compresses said bumper pad means said pocket will prevent the outward spreading of said bumper pad means.

2. A gob distributor according to claim 1, wherein each of said support means has an axial thru-bore and further comprises
- plunger means axially movable within said thru-bore,
- means for biasing said plunger means to a location beyond said bumper pad means, and
- switch means operable by the axial displacement of said plunger means.

* * * * *